US012568362B2

(12) United States Patent
Kawabata

(10) Patent No.: US 12,568,362 B2
(45) Date of Patent: Mar. 3, 2026

(54) MEASUREMENT DEVICE, MEASUREMENT SYSTEM, MEASUREMENT METHOD, AND MEASUREMENT PROGRAM

(71) Applicant: ARKRAY, Inc., Kyoto (JP)

(72) Inventor: Yutaka Kawabata, Kyoto (JP)

(73) Assignee: ARKRAY, Inc., Kyoto (JP)

( * ) Notice: Subject to any disclaimer, the term of this patent is extended or adjusted under 35 U.S.C. 154(b) by 188 days.

(21) Appl. No.: 18/472,220

(22) Filed: Sep. 22, 2023

(65) Prior Publication Data

US 2024/0107300 A1     Mar. 28, 2024

(30) Foreign Application Priority Data

Sep. 26, 2022     (JP) ................................. 2022-152946

(51) Int. Cl.
*H04W 12/0471* (2021.01)
*H04W 76/19* (2018.01)
(52) U.S. Cl.
CPC ....... *H04W 12/0471* (2021.01); *H04W 76/19* (2018.02)
(58) Field of Classification Search
CPC .. G16H 40/60; H04W 12/04; H04W 12/0471; H04W 12/06; H04W 12/50;
(Continued)

(56) References Cited

U.S. PATENT DOCUMENTS 9,288,614 B1 * 3/2016 Young ................ A61N 1/37254
10,007,473 B2 * 6/2018 Hampapuram ........ G16H 40/63
(Continued)

FOREIGN PATENT DOCUMENTS

JP          5535251 B2    7/2014
JP          5878424 B2    3/2016
WO     WO-2017043870 A1 *   3/2017

OTHER PUBLICATIONS

Afaneh, Mohammad. "How Bluetooth Low Energy Works: Advertisements (Part 1)", <https://web.archive.org/web/20201026220104/https://novelbits.io/bluetooth-low-energy-advertisements-part-1/>. Apr. 2020. (Year: 2020).*

(Continued)

*Primary Examiner* — Michael Simitoski
(74) *Attorney, Agent, or Firm* — Morgan, Lewis & Bockius LLP

(57)          ABSTRACT

A measurement device comprising: a processor; and a memory configured to store a program executed by the processor cause the measurement device to: first advertisement process for establishing a communication between a host device and a communication device by transmitting first advertisement information to the communication terminal, the first advertisement information including first state information indicating a state of the host device and first boding information indicating whether an encryption key used for the communication with the communication terminal is stored or not, in response to disconnection of the communication with the communication terminal, second advertisement process for re-establishing the communication between the host device and the communication terminal by transmitting second advertisement information after the encryption key is shared between the host device and the communication device, the second advertisement information including second boding information indicating that the encryption key is stored and second state information indicating a current state of the host device.

8 Claims, 9 Drawing Sheets

(58) Field of Classification Search
CPC ..... H04W 76/10; H04W 76/14; H04W 76/19;
H04W 4/80
See application file for complete search history.

(56) References Cited

U.S. PATENT DOCUMENTS

| | | | | |
|---|---|---|---|---|
| 10,182,336 | B1 * | 1/2019 | Stockton | H04W 76/14 |
| 10,542,574 | B1 * | 1/2020 | Jorgovanovic | H04W 36/035 |
| 2012/0274443 | A1 | 11/2012 | Kai et al. | |
| 2012/0276843 | A1 | 11/2012 | Yuasa | |
| 2013/0259230 | A1 * | 10/2013 | Polo | H04L 63/0272 |
| | | | | 380/270 |
| 2015/0304478 | A1 * | 10/2015 | Kim | G16H 40/63 |
| | | | | 455/414.3 |
| 2016/0210106 | A1 * | 7/2016 | Hampapuram | A61B 5/7445 |
| 2017/0303326 | A1 * | 10/2017 | Kwon | H04W 8/005 |
| 2017/0325161 | A1 * | 11/2017 | Kwon | H04W 88/04 |
| 2018/0007499 | A1 * | 1/2018 | Lee | H04W 76/10 |
| 2018/0182491 | A1 * | 6/2018 | Belliveau | A43B 3/34 |
| 2019/0135229 | A1 * | 5/2019 | Ledvina | H04W 12/50 |
| 2020/0084817 | A1 * | 3/2020 | Yoshimori | H04W 76/18 |
| 2020/0375457 | A1 * | 12/2020 | Van Tassel | H04W 76/14 |
| 2021/0142912 | A1 * | 5/2021 | Belliveau | H04W 12/068 |
| 2021/0176810 | A1 * | 6/2021 | Chae | H04W 76/14 |
| 2021/0196122 | A1 * | 7/2021 | Gerder | A61B 5/02055 |
| 2022/0070971 | A1 * | 3/2022 | Wang | H04W 48/08 |
| 2022/0124505 | A1 * | 4/2022 | Lin | H04W 4/80 |
| 2022/0202290 | A1 * | 6/2022 | Hua | A61B 5/02055 |
| 2022/0345871 | A1 * | 10/2022 | An | H04W 4/60 |
| 2022/0408266 | A1 * | 12/2022 | Weber | H04W 12/03 |
| 2023/0041669 | A1 * | 2/2023 | Zhang | H04W 4/40 |
| 2023/0091254 | A1 * | 3/2023 | Lee | H04L 63/123 |
| | | | | 726/4 |
| 2023/0247431 | A1 * | 8/2023 | Luo | H04W 12/122 |
| | | | | 713/171 |
| 2023/0422041 | A1 * | 12/2023 | Delahanty | H04W 12/037 |
| 2025/0142654 | A1 * | 5/2025 | An | H04W 8/005 |

OTHER PUBLICATIONS

Kwon, Younghwan et al. WO 2017043870 A1 (machine translation). Mar. 2017. (Year: 2017).*

Nikodem, Maciej, and Marek Bawiec. "Experimental evaluation of advertisement-based bluetooth low energy communication." Sensors 20.1 (2019): 107. (Year: 2019).*

Extended European Search Report issued in the corresponding Application No. 23198726.4, dated Nov. 29, 2023.

* cited by examiner

Figure 6:
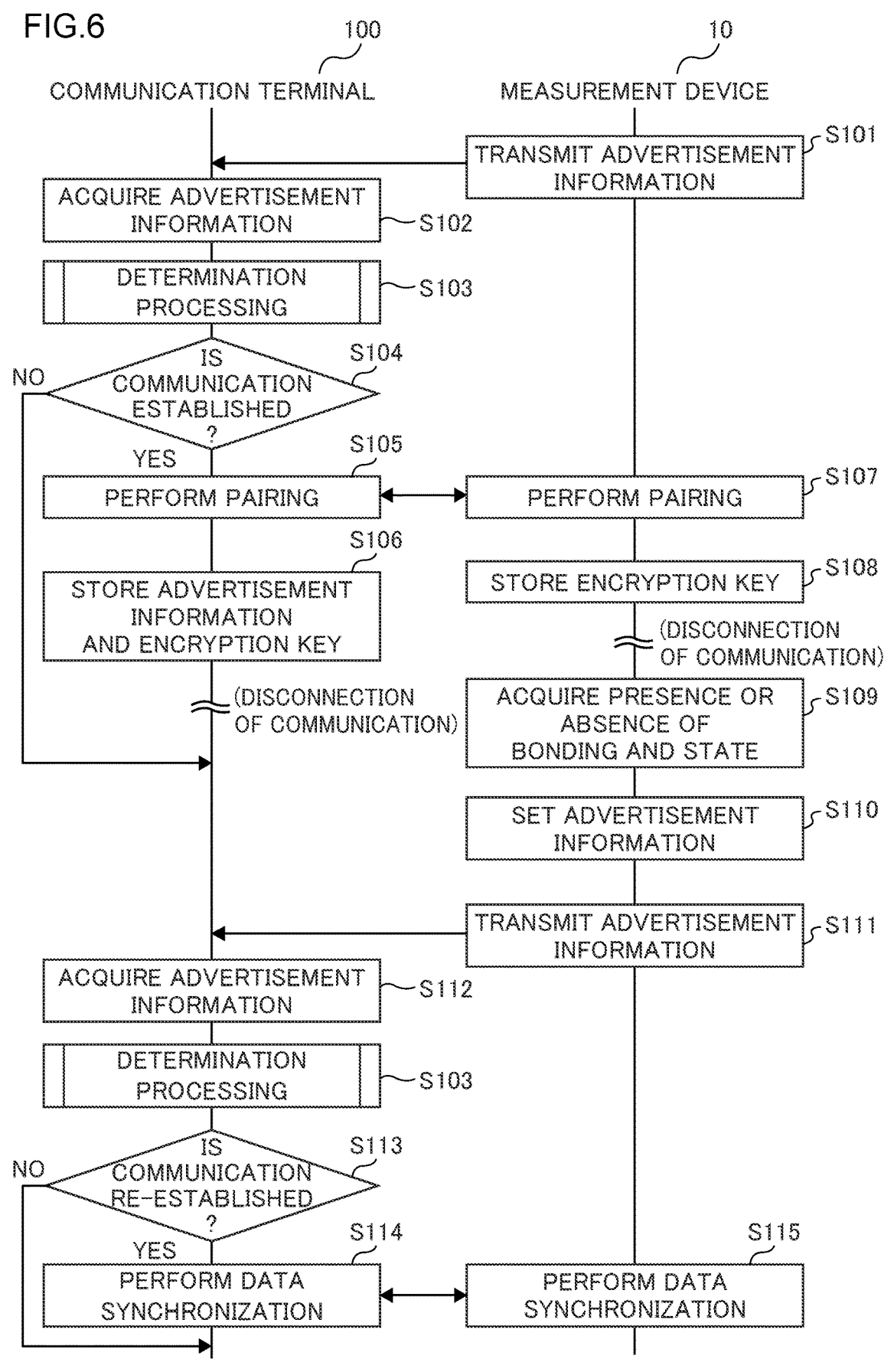

COMMUNICATION TERMINAL          MEASUREMENT DEVICE

TRANSMIT ADVERTISEMENT INFORMATION — S101

ACQUIRE ADVERTISEMENT INFORMATION — S102

DETERMINATION PROCESSING — S103

IS COMMUNICATION ESTABLISHED? — S104
NO

YES — S105

PERFORM PAIRING ←→ PERFORM PAIRING — S107

STORE ADVERTISEMENT INFORMATION AND ENCRYPTION KEY — S106

STORE ENCRYPTION KEY — S108

(DISCONNECTION OF COMMUNICATION)

(DISCONNECTION OF COMMUNICATION)

ACQUIRE PRESENCE OR ABSENCE OF BONDING AND STATE — S109

SET ADVERTISEMENT INFORMATION — S110

TRANSMIT ADVERTISEMENT INFORMATION — S111

ACQUIRE ADVERTISEMENT INFORMATION — S112

DETERMINATION PROCESSING — S103

IS COMMUNICATION RE-ESTABLISHED? — S113
NO

YES — S114

PERFORM DATA SYNCHRONIZATION ←→ PERFORM DATA SYNCHRONIZATION — S115

MEASUREMENT DEVICE, MEASUREMENT SYSTEM, MEASUREMENT METHOD, AND MEASUREMENT PROGRAM

CROSS-REFERENCE TO RELATED APPLICATION

This application is based on and claims priority under 35 USC 119 from Japanese Patent Application No. 2022-152946 filed on Sep. 26, 2022, the disclosure of which is incorporated by reference herein.

BACKGROUND

Technical Field

The present disclosure relates to a measurement device, a measurement system, a measurement method, and a measurement program.

Related Art

For example, Japanese Patent No. 5878424 discloses a sample measurement device including a measurement unit that performs measurement regarding a specific component contained in a sample, a measurement data storage unit that stores measurement data obtained by the measurement unit, a display unit that displays the measurement data, a sensor piece detection unit that detects insertion and removal of a sensor piece to which the sample is applied, and a first data transmission/reception unit that transmits the measurement data via wireless communication, in which the first data transmission/reception unit performs first authentication processing for wireless communication after insertion of the sensor piece is detected by the sensor piece detection unit, in a case in which the first data transmission/reception unit detects presence of plural communication devices that are targets of wireless connection, the display unit performs specifying and displaying of the plural communication devices as possible connection targets periodically one-by-one, and the first data transmission/reception unit performs the first authentication processing on one of the plural communication devices for which the specifying and displaying is performed in a case in which there is change in a detection state by the sensor piece detection unit among the plural communication devices.

For example, Japanese Patent No. 5535251 discloses a sample measurement device including a measurement unit that performs measurement regarding a specific component contained in a sample, a measurement condition determination unit that determines whether or not one or more measurement conditions necessary for the measurement are appropriate and generates measurement condition data including a determination result of whether or not this measurement condition is appropriate, a data transmission unit that transmits the measurement condition data via wireless communication, and a sensor piece detection unit that performs measurement of the sample in a state where a sensor piece to which the sample is applied is inserted and detects insertion and removal of the sensor piece, in which a standby state in which the sample cannot be measured is changed to an operating state in which the sample can be measured by detection of insertion of the sensor piece by the sensor piece detection unit, and the measurement condition determination unit automatically determines whether or not the measurement conditions are appropriate after the sensor piece is inserted and before measurement is performed by the measurement unit, the data transmission unit automatically performs wireless communication establishment processing after the sensor piece is inserted and before the measurement condition data is transmitted, and automatically transmits the measurement condition data after the measurement condition determination unit determines whether or not the measurement conditions are appropriate and before the measurement unit performs measurement.

SUMMARY

In recent years, there is a technology of transmitting a measurement result or the like collected by a measurement device (for example, smart watch or the like) to a communication terminal using Bluetooth low energy (BLE) communication and synchronizing data in the measurement device.

Meanwhile, in a case in which communication established once in the BLE communication is disconnected, the measurement device performs advertisement processing of periodically transmitting a connection request including information regarding the host device to the communication terminal. In the case of receiving the connection request by the advertisement processing, the communication terminal re-establishes communication between the communication terminal and the measurement device.

In such a situation, establishment and disconnection of the BLE communication are repeated every time the periodic advertisement processing is performed even in a case in which any particular data is not transmitted from the measurement device, and communication unintended by a user may be established.

In view of this, an aspect of the present disclosure is to provide a measurement device, a measurement system, a measurement method, and a measurement program capable of eliminating establishment of communication unintended by a user in a case in which a communication terminal and the measurement device perform BLE communication.

A measurement device according to an aspect of the disclosure includes a processor, in which the processor transmits advertisement information to a communication terminal in advertisement processing for establishing communication between a host device and the communication terminal, the advertisement information including state information indicating a state of the host device and bonding information indicating a presence or an absence of storage of an encryption key used for communication with the communication terminal, and in advertisement processing for re-establishing communication after the encryption key is shared between the host device and the communication terminal, the advertisement information includes bonding information indicating stored of the encryption key and state information indicating a current state of the host device.

According to the disclosure, establishment of communication unintended by a user can be eliminated in a case in which a communication terminal and a measurement device perform BLE communication.

BRIEF DESCRIPTION OF THE DRAWINGS

Exemplary embodiments of the present invention will be described in detail based on the following figures, wherein:

FIG. 6 is a sequence diagram illustrating an example of a flow of processing in a measurement system according to a first embodiment;

DETAILED DESCRIPTION

The present disclosure will become more fully understood from the detailed description given hereinbelow. Further range of application of the present disclosure will become clearer from the detailed description given hereinbelow. However, the detailed description and the specific embodiment are illustrated of desired embodiments of the present disclosure and are described only for the purpose of explanation. Various changes and modifications will be apparent to those ordinary skilled in the art on the basis of the detailed description.

The applicant has no intention to give to public any disclosed embodiment. Among the disclosed changes and modifications, those which may not literally fall within the scope of the patent claims constitute, therefore, a part of the present invention in the sense of doctrine of equivalents.

Figure 1:
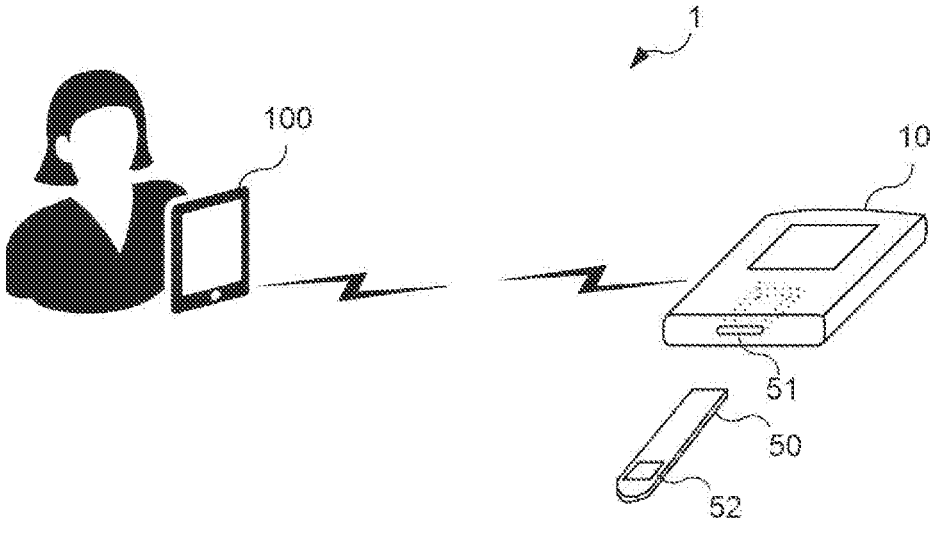
FIG. 1 is a schematic view illustrating an example of a measurement system according to each embodiment.

Hereinafter, exemplary embodiments for carrying out the disclosure will be described in detail with reference to the drawings. FIG. 1 is a schematic view illustrating an example of a configuration of a measurement system 1 according to the present embodiment.

As illustrated in FIG. 1 as an example, the measurement system 1 includes a measurement device 10 and a communication terminal 100. The measurement device 10 and the communication terminal 100 can be connected to each other via Bluetooth low energy (BLE) communication.

The measurement device 10 is a device that measures biological information of a user and transmits the biological information to the communication terminal. Here, the biological information is, for example, information indicating a blood glucose level, a blood oxygen concentration, a hemoglobin amount, a body temperature, a heartbeat, an electrocardiographic waveform, a blood pressure, or the like, and may be any biological information that can be measured from a human body. Hereinafter, a case in which the measurement device 10 is a blood glucose (BG) measurement device that measures a blood glucose level of a user will be specifically described as an example. For example, the measurement device 10 includes a sensor piece 50 for measuring a blood glucose level and an insertion port 51 into which the sensor piece 50 is inserted, and the sensor piece 50 may include a spotting unit 52 for being spotted with blood of a user. Here, the measurement device 10 may include a terminal (not illustrated) that is energized by the sensor piece 50 being inserted into the insertion port 51.

In the measurement device 10, the sensor piece 50 and the spotting unit 52 may be energized by the sensor piece 50 in which the spotting unit 52 is spotted with blood being inserted into the insertion port 51, and the blood glucose level in the blood may be electrically measured. Note that "spotting" according to the present embodiment means causing blood of the user to be applied to (absorbed by) the spotting unit 52.

The measurement device 10 can transmit a measurement result including a blood glucose level or the like measured via BLE communication to the communication terminal 100. Here, the measurement device 10 can establish communication by executing advertisement processing for establishing communication between the host device and the communication terminal 100 and transmitting information regarding the host device (hereinafter referred to as "advertisement information") together with a connection request. Here, the advertisement processing is processing of establishing communication with the communication terminal 100 by transmitting advertisement information together with a connection request. In a case in which communication with the communication terminal 100 is established, the measurement device 10 can transmit a measurement result to the communication terminal 100.

The advertisement information according to the present embodiment may be information including identification information, connection information, bonding information, and state information. Here, the identification information may be information for identifying the measurement device 10, the connection information may be information for identifying the communication terminal 100 as a connection destination, the bonding information may be information indicating the presence or absence of storage (bonding) of an encryption key by the measurement device 10, and the state information may be information indicating the state of the measurement device 10.

The communication terminal 100 may be a mobile terminal capable of communicating with an external device, specifically, a terminal such as a tablet or a personal computer. The communication terminal 100 can perform wireless communication with the measurement device 10 via BLE communication. For example, in the case of receiving a connection request and advertisement information by advertisement processing from the measurement device 10, the communication terminal 100 can establish communication by transmitting a connection response to the measurement device 10 according to the advertisement information. In a case in which the first communication is established, the communication terminal 100 can share (pair) an encryption key used in the case of communicating with the measurement device 10 with the measurement device 10 and store (bond) the encryption key.

In the case of storing the advertisement information received from the measurement device 10 in the first communication and re-establishing communication with the measurement device 10, the communication terminal 100 can determine whether or not to re-establish the communication according to the advertisement information and re-establish the communication.

Next, a hardware configuration of the measurement device 10 will be described with reference to FIG. 2.

Figure 2:
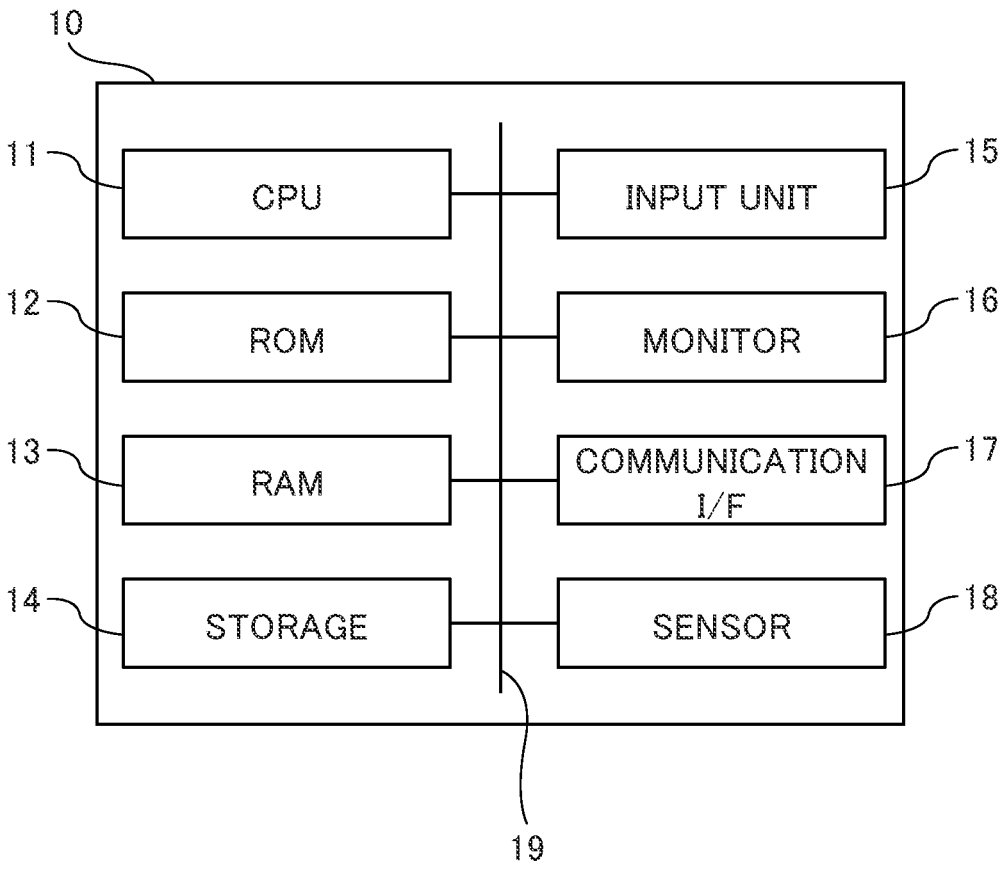
FIG. 2 is a block diagram illustrating an example of a hardware configuration of a measurement device according to each embodiment.

As illustrated in FIG. 2 as an example, the measurement device 10 according to the present embodiment may include a central processing unit (CPU) 11, a read only memory (ROM) 12, a random access memory (RAM) 13, a storage 14, an input unit 15, a monitor 16, a communication interface (communication I/F) 17, and a sensor 18. Each of the CPU 11, the ROM 12, the RAM 13, the storage 14, the input unit 15, the monitor 16, the communication I/F 17, and the sensor 18 may be connected to each other by a bus 19.

The CPU 11 can integrally control the entire measurement device 10. The ROM 12 may store various programs, data, and the like. The RAM 13 may be a memory used as a work area in a case in which various programs are executed. The CPU 11 can perform processing of establishing communication with the communication terminal 100 by deploying a program stored in the ROM 12 in the RAM 13 and executing the program.

The storage 14 can be configured by, for example, a hard disk drive (HDD), a solid state drive (SSD), a flash memory, or the like. Note that the storage 14 may store various programs and the like.

The input unit 15 may be a button that receives input, selection, and the like. The monitor 16 may be a display device or the like that displays characters and images. The communication I/F 17 may transmit and receive data using wireless communication conforming to the BLE standard.

The sensor 18 may be a sensor for detecting that the sensor piece 50 is inserted. The sensor 18 can be configured by, for example, an energization detection sensor that detects energization of the sensor piece 50 or a swing detection sensor that detects swing by the sensor piece 50.

Figure 3:
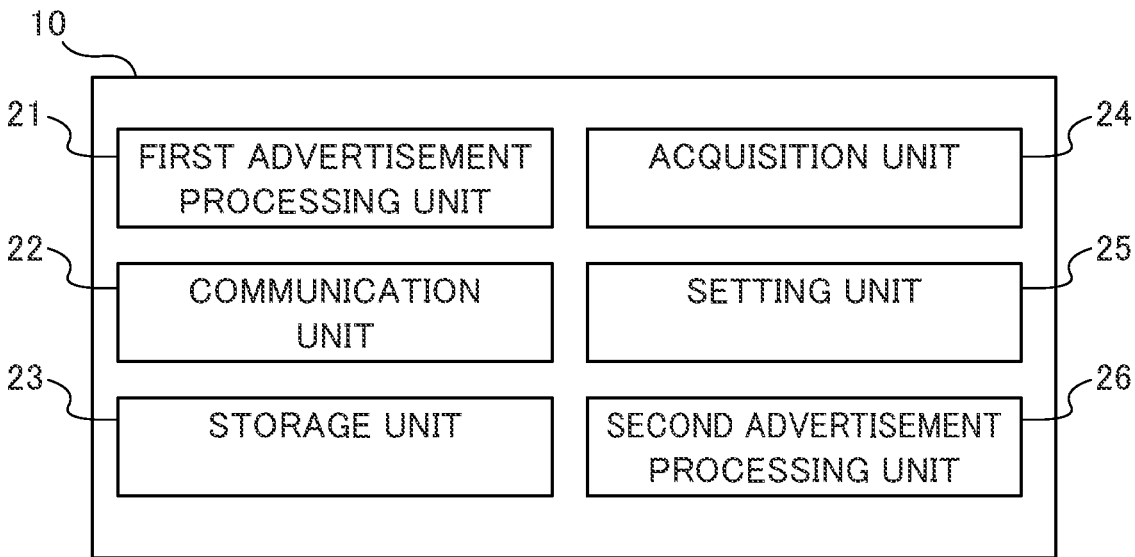
FIG. 3 is a block diagram illustrating an example of a functional configuration of the measurement device according to each embodiment.

Next, a functional configuration of the measurement device 10 will be described with reference to FIG. 3. FIG. 3 is a block diagram illustrating an example of a functional configuration of the measurement device 10 according to the present embodiment.

As illustrated in FIG. 3 as an example, the measurement device 10 may include a first advertisement processing unit 21, a communication unit 22, a storage unit 23, an acquisition unit 24, a setting unit 25, and a second advertisement processing unit 26. The CPU 11 can function as the first advertisement processing unit 21, the communication unit 22, the storage unit 23, the acquisition unit 24, the setting unit 25, and the second advertisement processing unit 26 by executing a program for establishing communication.

The first advertisement processing unit 21 may execute advertisement processing for establishing first communication with the communication terminal 100. Specifically, the first advertisement processing unit 21 may establish first communication with the communication terminal 100 by transmitting advertisement information together with a connection request.

In the advertisement information transmitted by the first advertisement processing unit 21, an identifier indicating the measurement device 10 is preferably set in the identification information, an identifier indicating the communication terminal 100 is preferably set in the connection information, "not stored" of an encryption key is preferably set in the bonding information, and "not changed" of the state is preferably set in the state information as initial values. Here, the identifier indicating the communication terminal 100 as the connection information may be an internet protocol (IP) address of the communication terminal 100, a media access control (MAC) address of the communication terminal 100, a channel used for BLE communication, or a management number on a database in which an application operating on the communication terminal 100 manages the measurement device 10.

The communication unit 22 can communicate with the communication terminal 100 for which communication has been established. For example, in a case in which first communication is established, the communication unit 22 can transmit an encryption key in the measurement device 10, receive the encryption key from the communication terminal 100, and perform pairing to share the encryption key. In a case in which communication is re-established by the second advertisement processing unit 26 to be described below, the communication unit 22 can transmit setting information regarding the measurement device 10 and a measurement result to the communication terminal 100 and synchronize data.

The storage unit 23 can perform bonding for storing the encryption key of the communication terminal 100 paired by the communication unit 22.

The acquisition unit 24 can acquire the state in the measurement device 10. Here, for example, the acquisition unit 24 can detect and acquire, as the state, a state in which the host device is activated, installation of a measurement target (specifically, sensor piece 50) in the host device, installation of a sample used in measurement, an operation of a user interface, change of setting of the host device by a user, transition to a state in which data can be received from the outside (for example, communication terminal 100), transition to a state in which a measurement result is output, or the like.

The setting unit 25 can set advertisement information. Specifically, the setting unit 25 can set the presence or absence of change in the state in the state information, and can set the presence or absence of storage of an encryption key in the bonding information in the advertisement information.

For example, in a case in which the acquisition unit 24 acquires a "state in which the host device is activated" as the state, the setting unit 25 can set "not changed" in the state information. In a case in which the acquisition unit 24, as the state, detects change in the current state in the host device after paring is performed and an encryption key is stored such as "installation of a measurement target (specifically, sensor piece 50) in the host device", "installation of a sample used in measurement", an "operation of a user interface", "change of setting of the host device by a user", "transition to a state in which data is acquired from the outside", or "transition to a state in which a measurement result is output", the setting unit 25 can set "changed" in the state information. In the present embodiment, a mode in which "not changed" or "changed" is set as the state information will be described, but the present invention is not limited thereto. The state of the measurement device 10 detected by the acquisition unit 24 may be set in the state information.

The setting unit 25 can set "stored" in the bonding information in a case in which the encryption key of the communication terminal 100 is stored in the storage unit 23, and can set "not stored" in the bonding information in a case in which the encryption key is not stored.

Note that a mode in which the setting unit 25 according to the present embodiment sets the bonding information and the state information as the advertisement information has been described, however, the present invention is not limited thereto. The setting unit 25 may set the connection information. For example, in a case in which designation of the communication terminal 100 for establishing communication is received from the user, the setting unit 25 may set an identifier indicating the designated communication terminal 100 in the connection information.

The second advertisement processing unit 26 can execute advertisement processing for re-establishing communication with the communication terminal 100. Specifically, the second advertisement processing unit 26 can re-establish communication with the communication terminal 100 by transmitting advertisement information set by the setting unit 25 together with a connection request.

Next, a hardware configuration of the communication terminal 100 will be described with reference to FIG. 4.

Figure 4:
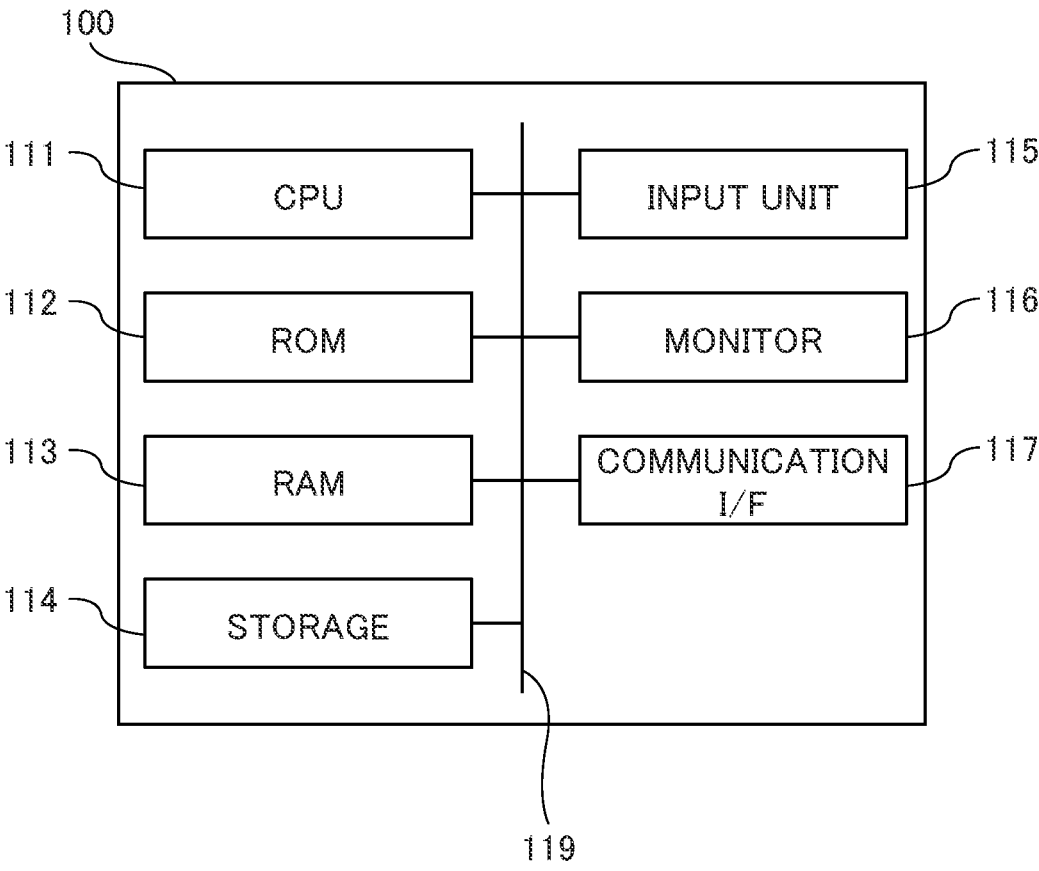
FIG. 4 is a block diagram illustrating an example of a hardware configuration of a communication terminal according to each embodiment.

As illustrated in FIG. 4 as an example, the communication terminal 100 according to the present embodiment may include a CPU 111, a ROM 112, a RAM 113, a storage 114, an input unit 115, a monitor 116, and a communication I/F 117. Each of the CPU 111, the ROM 112, the RAM 113, the storage 114, the input unit 115, the monitor 116, and the communication I/F 117 may be connected to each other by a bus 119.

The CPU 111 can integrally control the entire communication terminal 100. The ROM 112 may store various programs, data, and the like. The RAM 113 may be a memory used as a work area in a case in which various programs are executed. The CPU 111 can perform processing of establishing communication with the measurement device 10 by deploying a program stored in the ROM 112 in the RAM 113 and executing the program.

The storage 114 can be configured by, for example, an HDD, an SSD, a flash memory, or the like. Note that the storage 114 may store various programs and the like.

The input unit 115 may be a keyboard and a pointing device that receive input of characters, selection of an image, and the like. The monitor 116 may display characters and images. The communication OF 117 may transmit and receive data using wireless communication conforming to the BLE standard.

Figure 5:
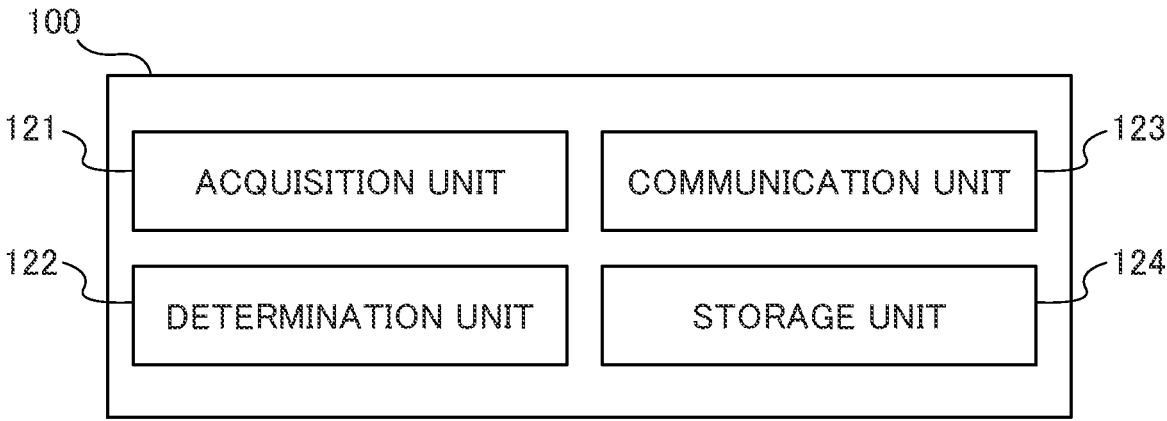
FIG. 5 is a block diagram illustrating an example of a functional configuration of the communication terminal according to each embodiment.

Next, a functional configuration of the communication terminal 100 will be described with reference to FIG. 5. FIG. 5 is a block diagram illustrating an example of the functional configuration of the communication terminal 100 according to the present embodiment.

As illustrated in FIG. 5 as an example, the communication terminal 100 may include an acquisition unit 121, a determination unit 122, a communication unit 123, and a storage unit 124. The CPU 111 can function as the acquisition unit 121, the determination unit 122, the communication unit 123, and the storage unit 124 by executing a program for establishing communication. A mode in which each function according to the present embodiment is implemented as a function included in the communication terminal 100 by a program for establishing communication stored in advance as an operation system being executed will be described. However, the present invention is not limited thereto. For example, the program for establishing communication may be stored in advance in the communication terminal 100 as an application that can be acquired by being downloaded from an external device, and each function may be implemented by the application being executed.

The acquisition unit 121 can acquire advertisement information transmitted from the measurement device 10.

The determination unit 122 can determine whether or not to establish communication with the measurement device 10 according to the acquired advertisement information. Specifically, in a case in which "not stored" is set to the bonding information in the acquired advertisement information, or in a case in which "stored" is set to the bonding information and "changed" is set to the state information, the determination unit 122 may determine to establish communication with the measurement device 10. In a case in which "stored" is set to the bonding information and "not changed" is set to the state information in the advertisement information, the determination unit 122 may determine not to establish communication for synchronizing data with the measurement device 10.

In a case in which communication establishment is determined in the determination result, the communication unit 123 can establish communication with the measurement device 10 and transmit and receive data to and from the measurement device 10.

Here, the communication unit 123 can establish first communication with the measurement device 10 in a case in which "not stored" is set to the bonding information in the advertisement information, and re-establish communication with the measurement device 10 in a case in which "stored" is set to the bonding information and "changed" is set to the state information. In a case in which first communication is established, the communication unit 123 can transmit the encryption key in the communication terminal 100, receive the encryption key from the measurement device 10, and perform pairing to share the encryption key. A mode in which "establishment of first communication" according to the present embodiment is establishment of communication performed before an encryption key is shared, and "re-establishment of communication" is establishment of communication after an encryption key is shared will be described.

The storage unit 124 can store advertisement information and an encryption key acquired from the measurement device 10.

Figure 7:
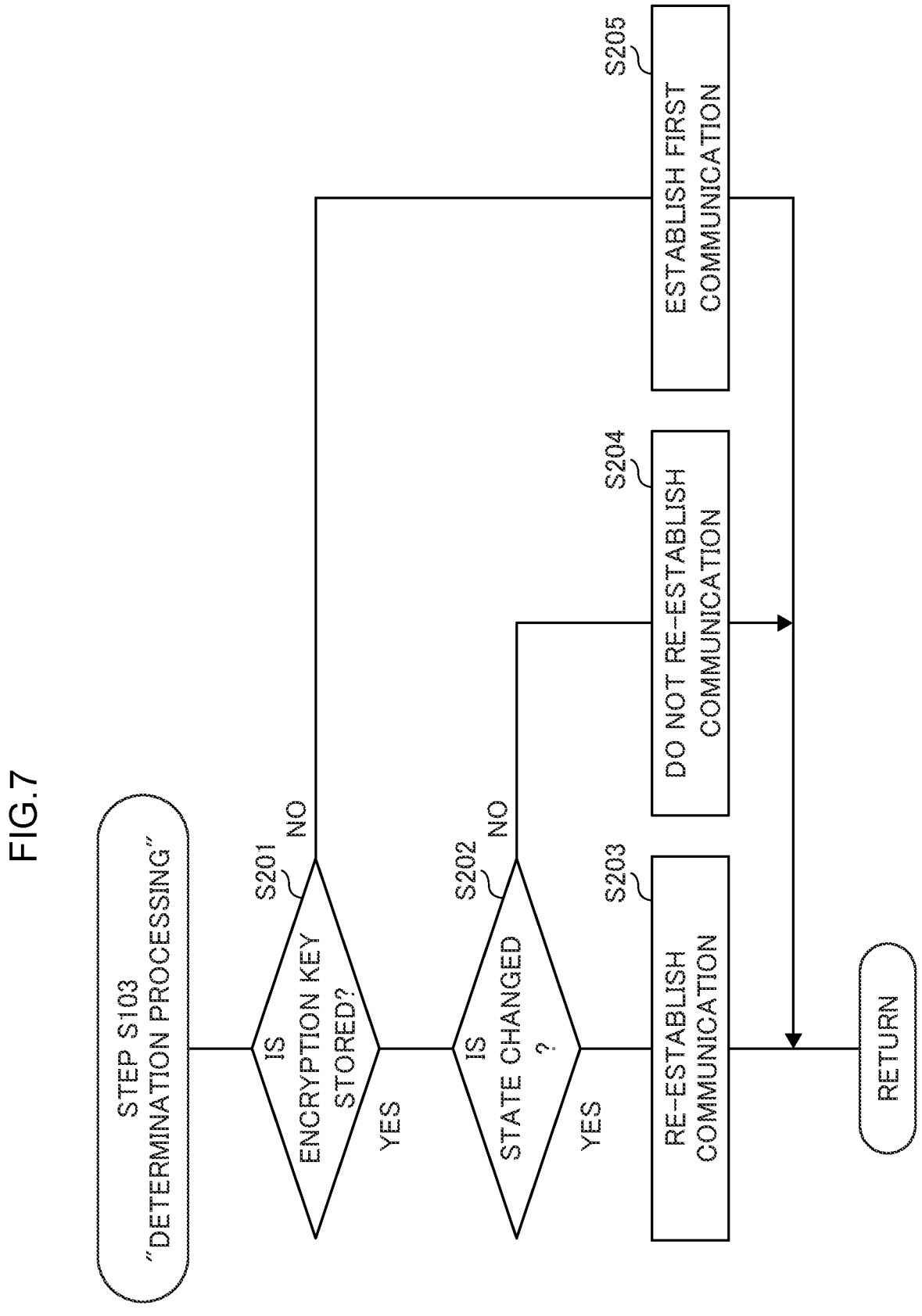
FIG. 7 is a flowchart illustrating an example of a flow of determination processing in a communication terminal according to the first embodiment.

Next, the operation of the measurement system in which the measurement device 10 and the communication terminal 100 cooperate with each other will be described with reference to FIGS. 6 and 7. FIG. 6 is a sequence diagram illustrating an example of a flow of the measurement system according to the present embodiment. In FIG. 6, steps in the same processing are denoted by the same reference signs, and description thereof is omitted.

As an example, the measurement device 10 sets advertisement information and transmits the advertisement information to the communication terminal 100 by advertisement processing as illustrated in FIG. 6 (step S101). Here, the measurement device 10 sets information indicating the measurement device 10 in the identification information, information indicating the communication terminal 100 in the connection information, "not stored" in the bonding information, and "not changed" in the state information as the initial values of the advertisement information.

The communication terminal 100 acquires the advertisement information transmitted from the measurement device 10 (step S102), and determines whether or not to establish communication with the measurement device 10 using the acquired advertisement information (step S103). Here, determination processing will be described in detail with reference to FIG. 7 described below.

The communication terminal 100 determines whether or not to establish communication, and in the case of establishing communication (step S104: YES), transmits a connection response to the measurement device 10 and establishes communication with the measurement device 10. Here, in a case in which "not stored" is set in the bonding information and first communication is established, the communication terminal 100 performs pairing of an encryption key (step S105), and after the communication is established, stores the advertisement information and the encryption key acquired from the measurement device 10 (step S106).

The communication terminal 100 determines whether or not to establish communication, and in the case of not establishing communication (step S104: NO), does not transmit a connection response to the measurement device 10 and does not establish communication with the measurement device 10.

In a case in which first communication is established, the measurement device 10 performs pairing of the encryption key (step S107), and stores (bonds) the received encryption key of the measurement device 10 (step S108).

In the case of communicating with the communication terminal 100 again after communication with the communication terminal 100 is disconnected in order to synchronize a measurement result, the measurement device 10 acquires the presence or absence of bonding and the state in the host device (step S109). The measurement device 10 sets the bonding information and the state information in the advertisement information according to the presence or absence of bonding and the current state of the host device (step S110), and transmits the advertisement information by advertisement processing (step S111). For example, the measurement device 10 sets "stored" in the bonding information in the advertisement information in a case in which the encryption key is stored (bonded), and sets "changed" in the state information in a case in which there is change in the host device.

The communication terminal 100 acquires the advertisement information transmitted from the measurement device 10 (step S112), and determines whether or not to establish communication with the measurement device 10 using the acquired advertisement information (step S103).

The communication terminal 100 determines whether or not to re-establish communication, and in the case of re-establishing communication (step S113: YES), transmits a connection response to the measurement device 10 and re-establishes communication with the measurement device 10. Here, in a case in which "stored" is set in the bonding information, "changed" is set in the state information, and communication with the measurement device 10 is re-established, the communication terminal 100 receives a measurement result and setting information from the measurement device 10 and performs data synchronization (step S114).

The communication terminal 100 determines whether or not to establish communication, and in the case of not establishing communication (step S113: NO), does not transmit a connection response to the measurement device 10 and does not establish communication with the measurement device 10.

In a case in which communication with the communication terminal 100 is re-established, the measurement device 10 transmits a measurement result and setting information and performs data synchronization (step S115).

Next, the operation of the communication terminal 100 will be described with reference to FIG. 7. FIG. 7 is a flowchart illustrating an example of a flow of the determination processing by the communication terminal 100 of the present embodiment.

In step S201, the CPU 111 determines whether or not "stored" is set to the bonding information in the acquired advertisement information. In a case in which "stored" is set in the bonding information (step S201: YES), the CPU 111 proceeds to step S202. On the other hand, in a case in which "stored" is not set in the bonding information ("not stored" is set in the bonding information) (step S201: NO), the CPU 111 proceeds to step S205.

In step S202, the CPU 111 determines whether or not "changed" of the state is set in the state information in the acquired advertisement information. In a case in which "changed" of the state is set in the state information (step S202: YES), the CPU 111 proceeds to step S203. On the other hand, in a case in which "changed" of the state is not set in the state information ("not changed" of the state is set in the state information) (step S202: NO), the CPU 111 proceeds to step S204.

In step S203, the CPU 111 determines to re-establish communication with the measurement device 10.

In step S204, the CPU 111 determines not to establish communication with the measurement device 10.

In step S205, the CPU 111 determines to establish first communication with the measurement device 10.

According to the present embodiment, establishment of communication unintended by a user can be eliminated in a case in which the communication terminal 100 and the measurement device 10 perform BLE communication as described above.

In the present embodiment, a mode in which whether or not to re-establish communication is determined according to the presence or absence of change in the state set in the state information has been described. However, the present invention is not limited thereto. In a case in which the state of the measurement device 10 is set in the state information, change in the state of the measurement device 10 may be determined by the acquired advertisement information being compared with the stored advertisement information, and whether or not to re-establish communication may be determined according to the presence or absence of the change in the state.

In the present embodiment, a mode in which first communication is established in a case in which "not stored" is set in the bonding information has been described. However, the present invention is not limited thereto. For example, in a case in which "not stored" is set in the bonding information but the encryption key is stored in the communication terminal 100, the communication terminal 100 may perform control such that communication is not established on the assumption that a discrepancy has occurred. The communication terminal 100 may perform control such that first communication is established even in the case of second establishment of communication (in other words, re-establishment).

Second Embodiment

In the first embodiment, a mode in which communication is established by advertisement information being transmitted from the measurement device 10 has been described. In the present embodiment, a mode in which communication is established by a connection request being transmitted from a communication terminal 100 will be described.

Hereinafter, the configuration of a measurement system 1 (see FIG. 1), the hardware configuration of a measurement device 10 (see FIG. 2), the functional configuration of the measurement device 10 (see FIG. 3), the hardware configuration of the communication terminal 100 (see FIG. 4), the functional configuration of the communication terminal 100 (see FIG. 5), and an example of the flow of determination processing (see FIG. 7) are the same as those of the first embodiment, and thus description thereof is omitted.

Figure 8:
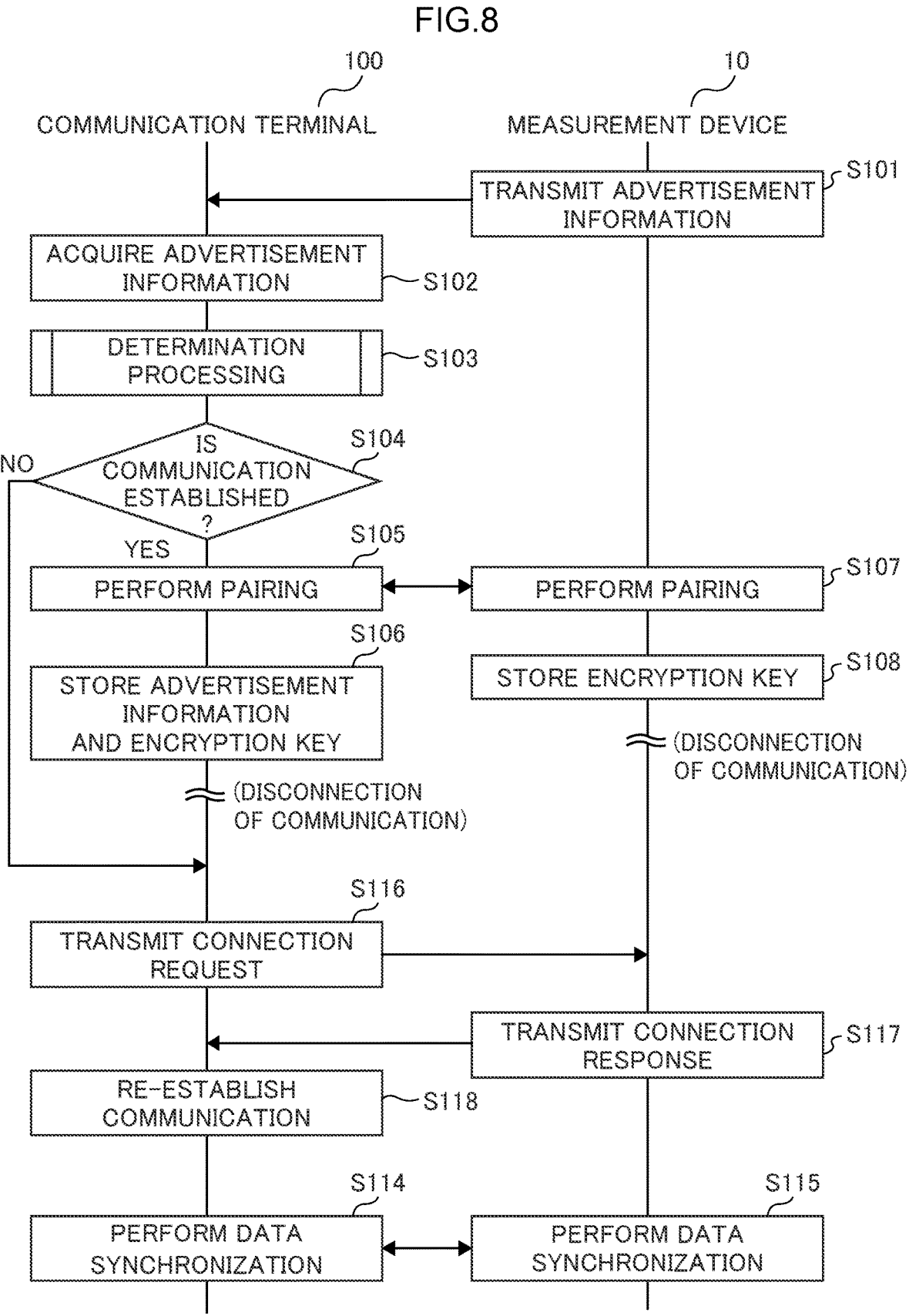
FIG. 8 is a sequence diagram illustrating an example of a flow of processing in a measurement system according to a second embodiment.

First, the operation of a measurement system in which the measurement device 10 and the communication terminal 100 cooperate with each other will be described with reference to FIG. 8. FIG. 8 is a sequence diagram illustrating an example of a flow of the measurement system according to the present embodiment. In FIG. 8, the same steps as those in the processing illustrated in FIG. 6 are denoted by the same reference signs as those in FIG. 6, and description thereof is omitted.

In the case of performing communication with the measurement device 10 again after communication with the measurement device 10 is disconnected, the communication terminal 100 executes scan processing (active scan) of transmitting a connection request in order to establish communication from the communication terminal 100 to the measurement device 10 (step S116).

In the case of establishing communication with the communication terminal 100, the measurement device 10 transmits a connection response to the received connection request and approves connection (step S117).

In the case of receiving the connection response, the communication terminal 100 re-establishes communication with the measurement device 10 regardless of advertisement information (step S118).

As described above, according to the present embodiment, communication with the desired measurement device 10 can be established by the communication terminal 100 being operated.

Third Embodiment

In the first embodiment and the second embodiment, a mode in which one measurement device 10 and one communication terminal 100 are included in the measurement system 1 has been described. In the present embodiment, a mode in which one measurement device 10 and plural communication terminals 100 are included in a measurement system 1 will be described. In the present embodiment, in a case in which the individual communication terminals 100 are distinguished, the individual communication terminals 100 are described as "communication terminal 100A" and "communication terminal 100B", and in a case in which the individual communication terminals 100 are not distinguished, the individual communication terminals 100 are simply described as "communication terminals 100".

Hereinafter, the configuration of the measurement system 1 (see FIG. 1), the hardware configuration of the measurement device 10 (see FIG. 2), the functional configuration of the measurement device 10 (see FIG. 3), the hardware configuration of a communication terminal 100 (see FIG. 4), the functional configuration of the communication terminal 100 (see FIG. 5), and an example of the flow of determination processing (see FIG. 7) are the same as those of the first embodiment, and thus description thereof is omitted.

Figure 9:
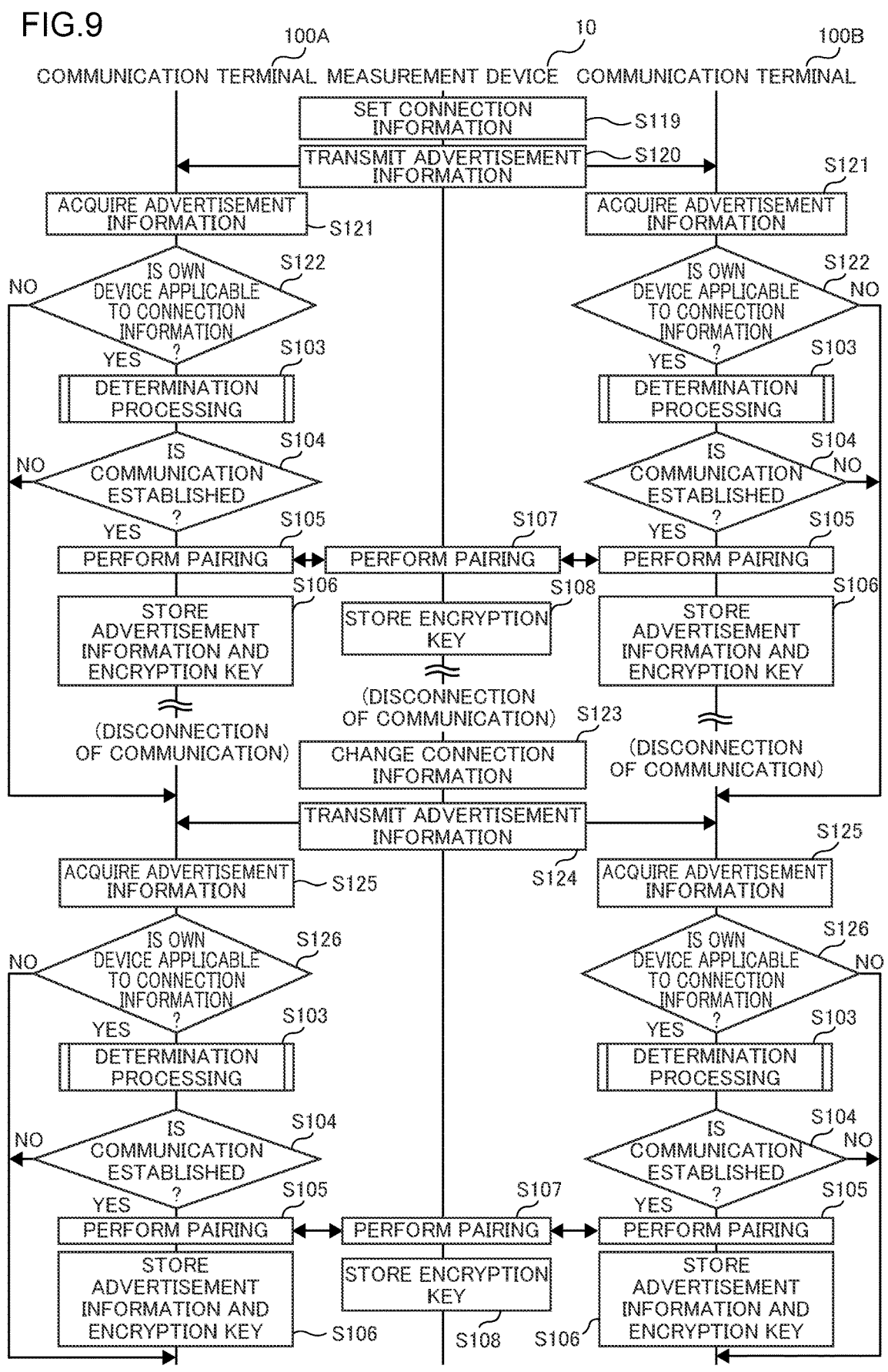
FIG. 9 is a sequence diagram illustrating an example of a flow of processing in a measurement system according to a third embodiment.

First, the operation of a measurement system in which the measurement device 10 and the communication terminals 100 cooperate with each other will be described with reference to FIG. 9. FIG. 9 is a sequence diagram illustrating an example of a flow of the measurement system according to the present embodiment. In FIG. 9, the same steps as those in the processing illustrated in FIG. 6 are denoted by the same reference signs as those in FIG. 6, and description thereof is omitted.

In the present embodiment, a mode in which the measurement device 10 can select a connection destination with which communication is desired to be established by a communication terminal 100 establishing communication according to connection information will be described. Hereinafter, a mode in which the communication terminal 100A and the communication terminal 100B are located in the vicinity of the measurement device 10 will be described.

The measurement device 10 sets information indicating a communication terminal 100 with which communication is desired to be established in the connection information in advertisement information (step S119), and transmits the advertisement information (step S120).

The communication terminals 100 acquire the advertisement information transmitted from the measurement device 10 (step S121), and determine whether or not the host device is applicable to the connection information using the acquired advertisement information (step S122). In a case in which the connection information indicates the host device (step S122: YES), the communication terminals 100 proceed to step S103 and perform determination processing. On the other hand, in a case in which the connection information does not indicate the host device (step S122: NO), the communication terminals 100 do not perform determination processing and do not establish communication with the measurement device 10.

Here, since information indicating the communication terminal 100A is set in the connection information in the advertisement information, communication between the communication terminal 100A and the measurement device 10 is established, and communication between the communication terminal 100B and the measurement device 10 is not established.

After the communication with the communication terminal 100A is disconnected, the measurement device 10 changes the information to information indicating the communication terminal 100B with which communication is desired to established, sets the information in the connection information (step S123), and transmits the advertisement information (step S124).

The communication terminals 100 acquire the advertisement information transmitted from the measurement device 10 (step S125), and determine whether or not to establish communication using the acquired advertisement information (step S126). In a case in which the connection information indicates the host device (step S126: YES), the communication terminals 100 proceed to step S103 and perform determination processing. On the other hand, in a case in which the connection information does not indicate the host device (step S126: NO), the communication terminals 100 do not perform determination processing and do not establish communication with the measurement device 10.

Here, since information indicating the communication terminal 100B is set in the connection information in the advertisement information, communication between the communication terminal 100A and the measurement device 10 is not established, and communication between the communication terminal 100B and the measurement device 10 is established.

In the present embodiment, a mode in which establishment of communication is controlled by connection information being changed has been described. However, the present invention is not limited thereto. Re-establishment of communication may be controlled by connection information being changed. Communication may be re-established by scan processing by a communication terminal 100 after connection information is changed and the communication is established.

According to the present embodiment, establishment of communication unintended by a user can be eliminated in a case in which plural communication terminals 100 exist as described above.

A mode in which the measurement device 10 according to the embodiments is a BG measurement device has been described. However, the present invention is not limited thereto. The measurement device 10 may be a blood pressure measurement device, a body temperature measurement device, or any device as long as data can be transmitted and received using BLE communication with an external communication terminal 100.

In each of the embodiments, a processor refers to a processor in a broad sense, and includes a general-purpose processor (for example, central processing unit (CPU) or the like) or a dedicated processor (for example, graphics processing unit (GPU), application specific integrated circuit (ASIC), field programmable gate array (FPGA), programmable logic device, or the like).

The operation of the processor in each of the embodiments may be performed not only by one processor but also by cooperation of plural processors that exist at physically separated positions. The order of each piece of the operation of the processor is not limited to the order described in each of the embodiments, and may be appropriately changed.

The measurement device and the communication terminal according to the embodiments have been described above by way of example. The embodiments may be in the form of a program for causing a computer to execute a function of each unit included in the measurement device and the communication terminal. The embodiments may be in the form of a non-transitory computer-readable storage medium that stores the program.

The configurations of the measurement device and the communication terminal described in the embodiments are merely examples, and may be changed according to the situation without departing from the gist.

The flows of processing of the program described in the embodiments are also merely examples, and unnecessary steps may be deleted, new steps may be added, or the processing order may be changed without departing from the gist.

In the embodiments, a case in which the processing according to the embodiments is implemented by a software configuration using a computer by a program being executed has been described, but the present invention is not limited thereto. The embodiments may be implemented by, for example, a hardware configuration or a combination of a hardware configuration and a software configuration.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

Regarding the embodiments, a supplement is further disclosed below.

(Supplement)

A measurement device according to a first aspect includes a processor, wherein the processor is configured to transmit advertisement information to a communication terminal in advertisement processing for establishing communication between a host device and the communication terminal, the advertisement information including state information indicating a state of the host device and bonding information indicating a presence or an absence of storage of an encryption key used for communication with the communication terminal, and in advertisement processing for re-establishing communication after the encryption key is shared between the host device and the communication terminal, the advertisement information includes bonding information indicating storage of the encryption key and state information indicating a current state of the host device.

In a measurement device according to a second aspect, communication for synchronizing data between the host device and the communication terminal is not established in a case in which the state information included in the advertisement information is not changed from a previous communication in the advertisement processing for re-establishing communication in the measurement device according to the first aspect.

In a measurement device according to a third aspect, in advertisement processing for establishing communication before the encryption key is shared between the host device and the communication terminal, the advertisement information includes bonding information indicating non-storage of the encryption key and state information indicating a current state of the host device in the measurement device according to the first aspect or the second aspect.

In the measurement device according to a fourth aspect, the processor further includes connection information for identifying a connection destination in established communication in the advertisement information in the measurement device according to any one of the first aspect to the third aspect.

In a measurement device according to a fifth aspect, in a case in which there are a plurality of communication terminals, the processor changes the connection information for each communication terminal that re-establishes communication and transmits the advertisement information in the measurement device according to the first aspect.

In a measurement device according to a sixth aspect, the processor changes the state information according to at least one of a presence or an absence of installation of a measurement target in the host device, a change of setting in the host device, a transition to a state in which a measurement result is output, or a transition to a state in which data transmitted from the communication terminal can be received in the measurement device according to any one of the first aspect to the fifth aspect.

A measurement system according to a seventh aspect includes a measurement device according to any one of the first aspect to the sixth aspect, and a communication terminal that receives the advertisement information and establishes communication with the measurement device.

In a measurement system according to an eighth aspect, the communication terminal re-establishes communication with the measurement device regardless of the advertisement information in a case in which scan processing for establishing communication from the communication terminal to the measurement device is performed in the measurement system according the seventh aspect.

In a measurement system according to a ninth aspect, the communication terminal re-establishes communication with the measurement device regarding received advertisement information in a case in which the state information indicates change and the bonding information indicates storage of the encryption key in the advertisement information, and does not re-establish communication with the measurement device regarding the advertisement information in a case in which the state information indicates no change or the bonding information indicates non-storage of the encryption key in the measurement system according to the seventh aspect or the eighth aspect.

A measurement method according to a tenth aspect includes transmitting advertisement information to a communication terminal in advertisement processing for establishing communication between a host device and the communication terminal, the advertisement information including state information indicating a state of the host device and bonding information indicating a presence or an absence of storage of an encryption key used for communication with the communication terminal, and in advertisement processing for re-establishing communication after the encryption key is shared between the host device and the communication terminal, the advertisement information includes bonding information indicating storage of the encryption key and state information indicating a current state of the host device.

A measurement program according to an eleventh aspect includes transmitting advertisement information to a communication terminal in advertisement processing for establishing communication between a host device and the communication terminal, the advertisement information including state information indicating a state of the host device and bonding information indicating a presence or an absence of storage of an encryption key used for communication with the communication terminal, and in advertisement processing for re-establishing communication after the encryption key is shared between the host device and the communication terminal, the advertisement information includes bonding information indicating storage of the encryption key and state information indicating a current state of the host device.

What is claimed is:

1. A measurement device comprising:
a processor; and
a memory configured to store a program executed by the processor to cause the measurement device to:
first advertisement process for establishing a communication between a host device and a communication terminal by transmitting first advertisement information to the communication terminal, the first advertisement information including first state information indicating a state of the host device and first bonding information indicating whether an encryption key used for the communication with the communication terminal is stored or not,
in response to disconnection of the communication with the communication terminal, second advertisement process for re-establishing the communication between the host device and the communication terminal by transmitting second advertisement information after the encryption key is shared between the host device and the communication terminal, the second advertisement information including second bonding information indicating that the encryption key is stored and second state information indicating a current state of the host device,
wherein in response to the second state information indicating that the current state of the host is the same as the state of the host device indicated by the first state information, the communication between the host device and the communication terminal is not established.

2. The measurement device according to claim 1, wherein the first advertisement information includes: connection information for identifying the communication terminal.

3. The measurement device according to claim 2, wherein when the communication terminal includes a plurality of communication terminals, the first advertisement information is set to include connection information for identifying each of the plurality of communication terminals.

4. The measurement device according to claim 1, wherein the first state information is set to indicate the state of the host device according to one or more selected from a presence or an absence of installation of a measurement target in the host device, a change of setting in the host device, a transition to a state in which a measurement result is output and a transition to a state in which data transmitted from the communication terminal can be received.

5. A measurement system comprising:
a communication terminal; and
a measurement device communicable to the communication terminal, the measurement device comprising:
a processor; and
a memory configured to store a program executed by the processor to cause the measurement device to:
first advertisement process for establishing a communication between a host device and the communication terminal by transmitting first advertisement information to the communication terminal, the first advertisement information including first state information indicating a state of the host device and first bonding information indicating whether an encryption key used for the communication with the communication terminal is stored or not,
wherein in response to disconnection of the communication with the communication terminal, the measurement device is configured to perform second advertisement process for re-establishing the communication between the host device and the communication terminal by transmitting second advertisement information after the encryption key is shared between the host device and the communication terminal, the second advertisement information including second bonding information indicating whether the encryption key is stored or not and second state information indicating a current state of the host device, and wherein in response to the second state information indicating that the current state of the host is different from the state of the host device indicated by the first state information and the second bonding information indicating that the encryption key is stored, the communication terminal is configured to re-establish the communication with the host device.

6. A measurement system comprising:
a communication terminal; and
a measurement device communicable to the communication terminal, the measurement device comprising:
a processor; and
a memory configured to store a program executed by the processor to cause the measurement device to:
first advertisement process for establishing a communication between a host device and the communication terminal by transmitting first advertisement information to the communication terminal, the first advertisement information including first state information indicating a state of the host device and first bonding information indicating whether an encryption key used for the communication with the communication terminal is stored or not,
wherein in response to disconnection of the communication with the communication terminal, the measurement device is configured to perform second advertisement process for re-establishing the communication between the host device and the communication terminal by transmitting second advertisement information after the encryption key is shared between the host device and the communication terminal, the second advertisement information including second bonding information indicating whether the encryption key is stored or not and second state information indicating a current state of the host device, and
wherein in response to the second state information indicating that the current state of the host is the same as the state of the host device indicated by the first state information or the second bonding information indicating that the encryption key is not stored, the communication terminal does not re-establish the communication with the host device.

7. A measurement method comprising:
first advertisement processing for establishing a communication between a host device and a communication terminal by transmitting first advertisement information to the communication terminal, the first advertisement information including first state information indicating a state of the host device and first bonding information indicating whether an encryption key used for the communication with the communication terminal is stored or not; and in response to disconnection of the communication with the communication terminal, performing second advertisement processing for re-establishing the communication between the host device and the communication terminal by transmitting second advertisement information after the encryption key is shared between the host device and the communication terminal, the second advertisement information including second bonding information indicating that the encryption key is stored and second state information indicating a current state of the host device, wherein in response to the second state information indicating that the current state of the host is the same as the state of the host device indicated by the first state information, the communication between the host device and the communication terminal is not established.

8. A non-transitory computer-readable storage medium storing a program that, when executed by a processor of a measurement device, causes the measurement device to:
first advertisement process for establishing a communication between a host device and a communication terminal by transmitting first advertisement information to the communication terminal, the first advertisement information including first state information indicating a state of the host device and first bonding information indicating whether an encryption key used for the communication with the communication terminal is stored or not, in response to disconnection of the communication with the communication terminal, second advertisement process for re-establishing the communication between the host device and the communication terminal by transmitting second advertisement information after the encryption key is shared between the host device and the communication terminal, the second advertisement information including second bonding information indicating that the encryption key is stored and second state information indicating a current state of the host device, wherein in response to the second state information indicating that the current state of the host is the same as the state of the host device indicated by the first state information, the communication between the host device and the communication terminal is not established.

* * * * *